3,839,450
N-BRANCHED ALKYL β-(3,4-DICHLOROPHENYL)-β-FLUOROETHYLAMINES
Bryan B. Molloy and Ronald R. Tuttle, Indianapolis, and William A. Day, Greenwood, Ind., assignors to Eli Lilly and Company, Indianapolis, Ind.
No Drawing. Filed July 12, 1971, Ser. No. 162,014
Int. Cl. C07c 87/28
U.S. Cl. 260—570.5 R  3 Claims

ABSTRACT OF THE DISCLOSURE

N-branched alkyl β-(3,4-dichlorophenyl)-β-fluoroethylamines, useful as anti-arrhythmia agents.

BACKGROUND OF THE INVENTION

N-[β-(3,4-dichlorophenyl)-β-hydroxyethyl]-isopropylamine, known as DCI, is disclosed in U.S. Pat. 2,938,921. The compound is useful as an epinephrine blocking agent for β-receptor action sites. N-[β-(3,4-dichlorophenyl)-β-chloroethyl]-isopropylamine is also a known compound being disclosed in *J. Med. Chem. 133*, 398 (1970) where it is said to be a weak β-blocker. N-[β-(3,4-dichlorophenyl)-β-fluoroethyl]-isopropylamine is disclosed in *Farm. Ed. Sci., 25*, 901 (1970), without any recital of pharmacologic or other utility.

DESCRIPTION

This invention provides compounds represented by the formula

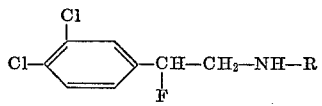

wherein R is a branched alkyl group having from 3 to 5 carbon atoms, as for example, isopropyl, sec.-butyl, t-butyl, t-amyl, sec.-amyl, 3-methyl-2-butyl and the like. Also included within the scope of this invention are the salts of the amine bases represented by the above formula formed with non-toxic acids. These acid addition salts include salts derived from non-toxic inorganic acids such as: hydrochloric acid, nitric acid, phosphoric acid, sulfuric acid, hydrobromic acid, hydriodic acid, nitrous acid, phosphorus acid and the like, as well as salts of non-toxic organic acids including: acetic acid, maleic acid, malic acid, tartaric acid, citric acid, benzoic acid, 2,4-dinitrobenzoic acid, p-chlorobenzoic acid, naphthoic acid, p-toluenesulfonic acid and the like.

The compounds of this invention demonstrate optical activity since the β carbon atom in the phenethyl sidechain is asymmetric, being attached to four different atoms or organic radicals. Thus, each of the compounds occurs as a "dl" pair; is, as a racemic mixture. When for any reason it is desired to employ a single enantiomorph, resolution of the racemic mixture can be achieved by procedures well known in the prior art, including formation of salts with optically active acids.

The compounds of this invention are prepared by the fluorination of 3,4-dichlorophenyl-cyanoacetic ester with perchloryl fluoride. Hydrolysis and decarboxylation yields α-(3,4-dichlorophenyl)-α-fluoroacetic acid which is transformed by standard procedures to the desired amide. Reduction of the amide proceeds in facile fashion with borane to yield a N-[β-(3,4-dichlorophenyl)-β-fluoroethyl] secondary amine of this invention, which secondary amine is customarily isolated as the hydrochloride or other salt.

Preparation of the optically active amines is conveniently achieved by separation of α-(3,4-dichlorophenyl)-α-fluoroacetic acid into its d and l isomers by forming salts with an optically active base, separating the less soluble salt from the reaction mixture and recovering the optically active acid. The optically active acid is then transformed by standard procedures as outlined above to the desired optically active secondary amine.

The compounds of this invention are anti-arrhythmic agents. They antagonize increases in ventricular automaticity induced by the sympathetic hormone and other adrenergic drugs as do beta adrenergic blocking agents like DCI without antagonizing increases in ventricular contractility. As such, they are useful in counteracting the arrythmias caused by isoproterenol, aconitine, halothanesensitization, myocardial infarction, and digitalis intoxication. For example, N-[β-(3,4-dichlorophenyl)-β-fluoroethyl]isopropylamine at very low dosages in dogs converts arrythmias caused by digitalis glycosides to normal sinus rhythm. Unlike the β-adrenergic antagonists, such as DCI, the compounds of this invention cause less "nonspecific depression" of cardiac contractility, (i.e. depression not related to impairment of the symphetic nervous systems influence on the heart). Thus, in actual practice, the compounds of this invention are less liable to cause death from sudden and marked drops in cardiac contractility, output, and blood pressure. Being freer of these severe side effects than DCI and related compounds, the compounds of this invention are safer for treating cardiac arrhythmias.

Both enantiomorphs of the racemic mixture represented by the above formula are active as anti-arrythmia agents.

EXAMPLE 1

N-[β-(3,4-Dichlorophenyl)-β-fluoroethyl] isopropylamine

Sodium ethylate was prepared by dissolving 12 g. of sodium in 300 ml. of absolute ethanol. To this mixture were added 300 ml. of diethyl carbonate and 94 g. of 3,4-dichlorophenylacetonitrile. Ethanol was removed by distillation, and toluene was added to the reaction mixture at the same rate as ethanol was removed by distillation. When the reaction was substantially complete, the mixture solidified and was cooled. One liter of water was added and the resulting mixture extracted with 1 l. of ethyl acetate. The aqueous layer was extracted twice more with 300 ml. portions of ethyl acetate. The ethyl acetate layers were combined, washed with water and dried. Evaporation of the solvent yielded a residue comprising a dark oil and a solid sodium salt. The residue was therefore treated with 25% aqueous acetic acid and ether. The ether layer yielded 127 g. of a dark oil after evaporation of the ether. Distillation of the dark oil yielded 3,4-dichlorophenylcyanoacetic ester boiling at about 140° C. at 0.5 mm. of Hg.

66.8 g. of the above ester in 100 ml. of dimethylformamide (DMF) were added to a suspension of 12 g. of a 60% mineral oil suspension of sodium hydride (washed free of mineral oil with hexane) in 400 ml. of DMF. The reaction mixture was stirred overnight in a nitrogen atmosphere. 22 ml. of ethanol were added to destroy any excess sodium hydride. The reaction mixture was then cooled to about 0° C. and an excess of perchlorylfluoride was introduced as a gas while maintaining the temperatures in the range 7–23° C. A change in bromthymol blue indicator from green to yellow indicated that the reaction was complete. The reaction mixture was then diluted with 600 ml. of water and extracted with 1 l. of ether. The ether extract was washed with water, dried and the ether evaporated *in vacuo*. The resulting residue, comprising 68 g. of orange oil, was dissolved in pentane and filtered. Distillation of the filtrate after evaporation of the pentane yielded ethyl α-(3,4-dichlorophenyl)-α-fluorocyanoacetate boiling at 98–100° C. at 0.15 mm./Hg.

*Analysis.*—Calc.: C, 47.84; H, 2.92; N, 5.07; Cl, 25.68; F, 6.88. Found: C, 48.04; H, 3.15; N, 4.93; Cl, 25.43; F, 7.00.

11.4 g. of the above α-fluorocyanoacetate were heated at refluxing temperature for 18 hours in a mixture containing 60 ml. of dioxane and 40 ml. of 6 N hydrochloric acid. The dioxane was evaporated, 200 ml. of water were added and the mixture extracted with two 150 ml. portions of ether. The ether extracts were combined, washed with water and then with two 100 ml. portions of 1 N sodium hydroxide. The alkaline aqueous extract was acidified with 12 N hydrochloric acid and the acidified solution extracted with two 150 ml. portions of ether. The ether extracts were combined, washed with water, and with a saturated sodium chloride solution and then dried. Evaporation of the ether therefrom *in vacuo* yielded an oil which crystallized upon standing and was recrystallized from a hexane-ether solvent mixture. M.P.=70.5–72.5° C.

*Analysis.*—Calc.: C, 43.08; H, 2.26; Cl, 31.79; F, 8.52. Found: C, 43.23; H, 2.10; Cl, 31.55; F, 8.71. The analysis is within limits of experimental error for α-(3,4-dichlorophenyl-α-fluoroacetic acid monohydrate.

4.46 g. of the above acid were dissolved in 100 ml. of benzene. 8.3 ml. of oxalyl chloride were added slowly in dropwise fashion. After the addition was complete, the mixture was refluxed for about three hours. α-(3,4-dichlorophenyl)-α-fluoroacetyl chloride thus prepared was reacted (without further purification) with 5 ml. of isopropylamine to yield N-isopropyl α-(3,4-dichlorophenyl)-α-fluoroacetamide melting at about 94–97° C. after recrystallization from cyclohexane.

*Analysis.*—Calc.: C, 50.02; H, 4.58; N, 5.30; F, 7.19; Cl, 26.85. Found: C, 49.99; H, 4.72; N, 5.52; F, 7.40; Cl, 26.65.

1.13 g. of the above amide in 25 ml. of tetrahydrofuran was added in dropwise fashion to 12.9 ml. of 1 M borane (as the tetrahydrofurane complex) solution in tetrahydrofurane under a nitrogen atmosphere. The reaction mixture was heated at refluxing temperatures for about 4 hours and then cooled. 2 N HCl was added cautiously in dropwise fashion until gas evolution ceased. The THF was evaporated and 50 ml. of water were added. The aqueous layer was made basic by the addition of 5 N sodium hydroxide. The aqueous layer was extracted with ether and the ether layer washed with water followed by three 50 ml. portions of 2 N HCl, thus forming the hydrochloride salt of N-[β-(3,4-dichlorophenyl)-β-fluoroethyl]isopropylamine. Evaporation of volatile constituents *in vacuo* yielded a residue of the hydrochloride salt which gave crystalline material from a 50:50 isopropanol-ethyl acetate solvent mixture. The N-[β-(3,4-dichlorophenyl)-β-fluoroethyl]isopropylamine thus purified melted at about 199–201° C.

*Analysis.*—Calc.: C, 46.09; H, 5.27; N, 4.88; F, 6.62; Cl, 37.11. Found: C, 46.22; H, 5.27; N, 4.83; F, 6.90; Cl, 36.87.

N-[B - (3,4 - dichlorophenyl)-β-fluoroethyl]isopropylamine free base is prepared from the hydrochloride salt by adding an equivalent amount of base such as dilute sodium hydroxide to an aqueous solution of the salt, extracting the free base into ether, separating the ether layer and removing the ether by evaporation *in vacuo*, leaving the free base as a residue.

EXAMPLE 2

N-[β-(3,4-Dichlorophenyl)-β-fluoroethyl]-*t*-butylamine

Following the procedure of Example 1, 4.46 g. of α-(3,4-dichlorophenyl)-α-fluoroacetic acid monohydrate dissolved in 120 ml. of benzene were mixed with 8.3 ml. of oxalyl chloride to yield α-(3,4-dichlorophenyl)-α-fluoroacetyl chloride. The volatile constituents were removed from the reaction mixture by evaporation *in vacuo* and the residual acid chloride was dissolved in 100 ml. of ether. 7.3 g. of *t*-butylamine were added thereto dropwise with cooling. N-*t*-butyl-α-(3,4-dichlorophenyl)-α-fluoroacetamide thus prepared was purified by the procedure of Example 1, melting at about 84.5–86.5° C. after recrystallization from cyclohexane.

*Analysis.*—Calc.: C, 51.81; H, 5.07; N, 5.04; F, 6.83. Found: C, 51.31; H, 5.30; N, 4.80; F, 6.89.

Still following the above procedure, 3.3 g. of the above acetamide dissolved in 50 ml. of THF were added slowly in dropwise fashion to 50 ml. of a 1 M solution of borane-THF complex in THF. N-[β-(3,4-dichlorophenyl)-β-fluuoroethyl]-*t*-butylamine thus prepared was isolated and purified as the hydrochloride salt following the procedure of Example 1. Recrystallization of the hydrochloride salt from isopropanol yielded N-[β-(3,4-dichlorophenyl)-β-fluoroethyl]-*t*-butylamine hydrochloride melting at about 242–244° C.

*Analysis.*—Calc.: C, 47.94; H, 5.70; N, 4.66; F, 6.32; Cl, 35.38. Found: C, 48.21; H, 5.98; N, 4.54; F, 6.51; Cl, 35.60.

N-[β-(3,4-dichlorophenyl)-*t*-butylamine free base is prepared by the procedure utilized for the preparation of the corresponding isopropylamine free base as set forth in Example 1.

Other compounds prepared by the above procedures include:

N-[β - (3,4 - dichlorophenyl)-β-fluoroethyl]isobutylamine hydrochloride. M.P.=213–215° C. after recrystallization from isopropanol-ethyl acetate.

*Analysis.*—Calc.: C, 47.94; H, 5.70; N, 4.66; F, 6.32; Cl, 35.38. Found: C, 48.06; H, 5.84; N, 4.65; F, 6.62; Cl, 35.32.

N-[β-(3,4-dichlorophenyl)-β-fluoroethyl *sec.* - butylamine hydrochloride. M.P.=190–192° C. after recrystallization from isopropanol-ethyl acetate.

*Analysis.*—Calc.: C, 47.94; H, 5.70; N, 4.66; F, 6.32; Cl, 35.38. Found: C, 48.03; H, 5.85; N, 4.88; F, 6.06; Cl, 35.46.

N-[β-(3,4-dichlorophenyl)-β-fluoroethyl] 1 - ethylpropylamine hydrochloride. M.P.=159–161° C. after recrystallization from isopropanol-ethyl acetate.

*Analysis.*—Calc.: C, 49.62; H, 6.09; N, 4.45; F, 6.04; Cl, 33.80. Found: C, 49.84; H, 6.28; N, 4.55; F, 6.06; Cl, 34.14.

Amide intermediates useful in the preparation of the above amine bases include:

N-isobutyl α-(3,4-dichlorophenyl)-α-fluoroacetamide. M.P.=58–60° C.

N-*sec.*-butyl α-(3,4-dichlorophenyl)-α-fluoroacetamide. M.P.=78–80° C.

N-1-ethylpropyl α-(3,4 - dichlorophenyl)-α-fluoroacetamide. M.P.=87–90° C.

EXAMPLE 3

1-(−)-N-[β-(3,4-Dichlorophenyl)-β-fluoroethyl] isopropylamine 44.6 g. of α-(3,4-dichlorophenyl)-α-fluoroacetic acid were dissolved in 250 ml. of benzene and this solution mixed with a solution of 56.6 g. d-1,2-diphenyl-2-hydroxy-3-methyl-4-dimethylaminobutane (d-carbinol) in 250 ml. of benzene. The combined solutions were heated. 600 ml. of cyclohexane were added and the mixture allowed to stand at room temperature for about 36 hours. Crystals of the d-carbinol salt of the 1-α-fluoroacetic acid precipitated and were separated by filtration. Successive recrystallization of this salt yielded 33 g. of salt from which 13.5 g. of 1-(−)-α-(3,4-dichlorophenyl)-α-fluoroacetic acid were obtained by neutralization, extraction, evaporation of the extraction solvent and recrystallization. The l-acid thus obtained was converted to 1-(−)-N-[β-(3,4 - dichlorophenyl)-β-fluoroethyl]isopropylamine hydrochloride according to the procedure of Example 1. M.P.=196–200° C.; [α]$_d$=−25.1°.

d-(+)-N-[β-(3,4-dichlorophenyl)-β-fluoroethyl] isopropylamine hydrochloride was prepared by isolating d-α-(3,4-dichlorophenyl)-α-fluoroacetic acid from the mother liquors obtained in the above isolation of the corresponding 1-acid. In this preparation, 1-1,2-diphenyl-2-hydroxy-3-methyl-4-dimethylaminobutane (1-carbinol) was added to form a salt with the d-fluoroacetic acid. Recrystallization of the salt from benzene followed by isolation of the free acid from the salt yielded 11.6 g. of d-α-(3,4-dichlorophenyl)-3-fluoroacetic acid. Conversion of the free acid to d-N-[β-(3,4-dichlorophenyl)-β-fluoroethyl] isopropylamine hydrochloride was accomplished by the procedure of Example 1. M.P.=198–202° C.; [α]$_d$=+22.7°.

EXAMPLE 4

Preparation of Salts

Salts of the free bases of this invention, other than the hydrochloride salts whose preparation is illustrated in Examples 1 and 2, are prepared by dissolving the free base in ether and adding an equivalent of a suitable non-toxic acid, also in ether. The salts thus formed, as for example the sulfate and phosphate salts, are insoluble in ether and can be isolated by filtration. Alternatively, the amine base can be dissolved in ethanol and an equivalent of the acid added as an ethanolic solution. In this instance, since the salts thus formed are soluble in the reaction mixture, they are isolated by evaporation of the solvent in vacuo. Salts which can be formed by the above procedure include the hydrochloride, sulfate, hydrobromide, phosphate, hydrogen phosphate, dihydrogen phosphate, acetate, maleate, succinate, tartrate, citrate, benzoate, and p-toluene sulfonate salts of N-[β-(3,4-dichlorophenyl)-β-fluoroethyl] isopropylamine and the corresponding t-butyl, sec.-butyl and t-amyl amines.

In suppressing cardiac arrhythmias in patients suffering therefrom, the compounds of this invention can be administered in any of the standard dosage forms, either as the free base or in the form of an acid addition salt with a non-toxic acid. Salts of the amine bases of this invention are preferred for administration to patients since such salts are more stable and easier to formulate than the free bases themselves. We prefer to employ an isotonic solution of an acid addition salt of a base represented by the above formula and to continuously infuse said solution into the patient by the intravenous route. For such continuous intravenous infusion, a dose amount varying from about 0.1 mg. to 2 mg. per kg. of body weight per minute is employed.

We claim:
1. A compound of the formula

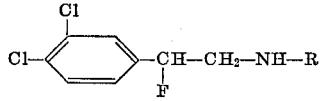

wherein R is a branched $C_3$–$C_5$ alkyl group, and acid addition salts thereof derived from non-toxic acids.

2. A compound according to claim 1, said compound being N-[β-(3,4-dichlorophenyl)-β-fluoroethyl] isopropylamine.

3. A compound according to claim 1, said compound being N-[β-(3,4-dichlorophenyl)-β-fluoroethyl] t-butylamine.

References Cited

UNITED STATES PATENTS 3,281,468  10/1966  Mills _____ 260—570.6

OTHER REFERENCES

Bruno et al., "Farmaco Ed. Sci.," Vol. 25(12), pp. 901–911 (1970).

Garner et al., "The Journal of Pharmacology and Experimental/Therapeutics," Vol. 162, No. 1, pp. 38–48 (1968).

Levy et al., "Journal Pharmacol. Exptl. Therapy," Vol. 133, pp. 202–10 (1961).

Howe, "Journal of Med. Chemistry," Vol. 13, No. 3, pp. 398–403 (1970).

ROBERT V. HINES, Primary Examiner

U.S. Cl. X.R.

260—465 (D), 501.1, 501.21, 515 (A), 544 (F), 558 (R); 424—316, 330